Patented Nov. 19, 1935

2,021,740

UNITED STATES PATENT OFFICE 2,021,740

TREATMENT OF HYDROCARBON OILS

Gustav Egloff and Jacque C. Morrell, Chicago, Ill., assignors to Universal Oil Products Company, Chicago, Ill., a corporation of South Dakota No Drawing. Application July 17, 1931, Serial No. 551,552

5 Claims. (Cl. 196—36)

This invention relates to the treatment of hydrocarbon oils, and refers more particularly to the refining of relatively low boiling hydrocarbon distillates at elevated temperatures, especially those resulting from the conversion of relatively high boiling hydrocarbons at elevated temperatures. More particularly the invention is directed towards the removal of sulphur from such hydrocarbons.

More specifically the invention comprises subjecting hydrocarbon oil vapors to treatment with aqueous solutions of oxygenated halogen acids such as hypochlorous acid, chloric acid, bromic acid and iodic acid and mixtures of the same in the presence of solid contact materials of a non-metallic nature, such as fuller's earth, clays, bentonite, greensand, bauxite, crushed fire-brick, pumice stone and other materials of an earthy or siliceous nature. It is to be understood that the various reagents mentioned are not strictly on an equivalent basis in regard to their refining action and may vary in degree, the conditions selected for each depending on the stock being treated and the results desired.

It is recognized that materials like fuller's earth may have an independent refining effect, quite different, however, from the action of the oxygenated halogen acids in that fuller's earth and similar materials while having a marked polymerizing influence have substantially no effect in respect to reduction in sulfur content. Materials like crushed firebrick serve the principal purpose of providing large contacting surface and a spreading or spacing effect on the active reagents. The vapor undergoing treatment may be mixed with oxygen-containing gases and steam, the former assisting in the chemical reactions produced by the solution of oxygenated halogen acids and the latter serving to maintain proper concentrations of the solutions by preventing excessive evaporation of solvent. As examples of oxygen-containing gases, air, oxygen, ozone alone or in combination may be mentioned, ozonized air having been found to be particularly efficacious in some instances.

In some cases the siliceous contact masses may be mixed with minor amounts of materials of a basic nature, such as metals or their oxides, these resulting in some instances from the decomposition of compounds of the metals incorporated with the earthy materials prior to their roasting and in other instances from the disintegration reactions of the earthy materials during their use in the process. The effect of the bases may be of a chemical or merely of a catalytic nature.

The invention is more particularly directed to the treatment of vapors of lower boiling cracked distillates though straight run distillates may also be treated within the scope of the invention, and is also particularly directed towards the desulfurization of hydrocarbons and especially cracked hydrocarbons.

The oxygenated halogen acids, the use of which is comprised in the present invention, have analogous properties to a considerable extent in that they all exert an oxidizing and some polymerizing action upon cracked hydrocarbon vapors whether dissolved alone in water or dissolved along with other salts and alkalies which may have been produced incidentally to the production of the desired acid. It is recognized, however, that they differ in degree and to some extent in the nature of the reactions produced. To assist in giving a clear understanding of the nature of the process it will be of advantage to state briefly some of the reactions involved and the products produced when halogens are added to water or aqueous solutions of various alkaline substances.

When chlorine is added to water, simple solution occurs in the absence of alkaline materials except that chlorine hydrates are formed when temperatures are reduced. When chlorine is passed into aqueous solutions of sodium carbonate of approximately 5% to 10% concentration the primary reaction forms sodium hypochlorite, sodium chloride and sodium bicarbonate, further addition of chlorine resulting in the decomposition of the bicarbonate to form an equivalent of hypochlorous acid and sodium chloride and evolve carbon dioxide as a gas. To form more highly oxygenated chlorine acids such as chloric or perchloric acid the action of powerful oxidants is essential such as ozone, nitric acid, etcetera. Free hypochlorous acid is produced in a generally similar manner to that described above when an excess of chlorine is passed through caustic soda solutions. The acid is also formed in considerable amounts by the electrolysis of brine solutions usually in stoneware cells divided into small compartments to insure ready and thorough mixing of anodic and cathodic products.

Solutions containing free hypochlorous acid and more highly oxygenated acids and as such adaptable to use in the present invention may also be produced by passing chlorine into suspensions of calcium hydrate. Primary reactions result in formation of hypochlorous acid, which further reacts with more chlorine to form chlorine oxide and calcium chlorate. Similar reactions may also be brought about by passing chlorine into aqueous suspensions of carbonates of the alkaline earth metals such as calcium and magnesium.

The case of bromine is somewhat different than that of chlorine in that the hypothetical hypobromous acid may not be formed when alkaline solutions are saturated with bromine, but rather salts of bromic acid such as sodium bromate. The latter compound may also be prepared by the electrolysis of sodium bromide solutions in any form of apparatus which may be employed in electrolyzing sodium chloride solutions to form hypochlorites.

The saturation of caustic alkalies such as a solution of potassium hydrate with iodine also tends to form the iodate rather than salts of the hypothetical hypoiodous acid analogous to the hypobromous acid mentioned in the preceding paragraph.

It will be obvious from the preceding descriptive matter as to the various oxygenated halogen acids which may be produced by conducting chlorine, bromine or iodine into aqueous solutions under suitable conditions that reagents of varying strength and effectiveness for use in treating cracked vapors may be produced. The method of production of these different reagents is quite general and the products may be used in particular cases to produce controllable results upon a large number of types of cracked vapors of variable composition. The use of fluorine is excepted because of the violent nature of the reaction between this element and water which results in instantaneous decomposition of the water with the liberation of highly ozonized oxygen, this forming an exception to the general reactions of the other halogens as in many other cases.

In applying the process of the invention to practice any suitable equipment may be employed which will permit the contacting of the hydrocarbon vapors and the treating reagents employed with the solid contacting or polymerizing materials; for example, a suitable tower or chamber packed with a selected mixture of contact materials may be employed following the fractionator of a cracking system, the reagents being introduced at a suitable point or points along the line of flow of the ascending or descending vapors, thus permitting contact of the mixture of hydrocarbon oil vapors, oxygen-containing gases and steam with the solution of oxyhalogen acid and the solid contact materials. Similarly, any device which permits the efficient contacting of the hydrocarbon vapors undergoing treatment with gases, liquids and solids may be employed. The solid contacting materials may sometimes be employed in successive strata of varying composition.

It has been found desirable to neutralize the vapors before or after condensation and to this end the vapors may be treated with ammonia gas or pass counterflow to solutions of alkalis in auxiliary neutralizing equipment or the condensed vapors may be treated with liquid alkalis such as solutions of caustic soda, ammonia or the like, the traces of reagents and reaction products remaining being washed out with water when found necessary. In cases involving the use of solutions containing only a small excess of the oxygenated acid, the excess of acid may be completely consumed so that subsequent neutralization is not necessary.

Reactions involved in treatments comprised within the scope of the invention are of a complicated nature from a chemical standpoint, but the net results are in the direction of reduced unsaturation and sulphur content in the treated product. The nature and extent of the reactions with any particular type of hydrocarbon vapors will vary with the amount and nature of the particular oxyhalogen acid solution employed, and also with the amount and type of oxidizing gas mixture and the amount of steam used. It has already been mentioned that the reactivity and treating action of the acids which may be used vary in degree and that while they produce similar effects that they are not precise equivalents.

Temperatures and pressures employed in treating operations may vary over a wide range, and it may be advisable in certain instances to use the less reactive acid than the more reactive to control the extent of polymerization desired. Frequently, the element of cost enters into consideration as well. By the use of varying mixtures of the oxyhalogen acids and different oxygen-containing gases, and steam, it has been found possible to produce a wide range of treating effects, all tending toward the selective elimination of unsaturated compounds and reduction in sulphur content. The reactions involved when solutions of oxyhalogen acids act upon hydrocarbon vapors are apparently of an oxidizing and polymerizing nature, particularly in the presence of oxygen-containing gases and solid adsorbent materials, both of which also assist the reactions. Whatever fixation of halogen occurs seems to be taken care of by the fact that the addition compounds are higher boiling than the original hydrocarbons from which they were formed, and as such are left behind as heavy refluxes during the subsequent fractionation of the treated vapors.

The amounts of reagent used in conducting treatments comprised within the scope of the invention will vary over a wide range, depending on the chemical nature of the particular vapors in question, the extent of refining action desired and the efficiency of the particular reagent chosen from the standpoint of economy and availability. The use of hypochlorous acid has been shown to be of definite commercial value and experimental results thus far obtained indicate that beneficial results are also obtainable by the use of the more highly oxygenated chlorine acids and corresponding acids of bromine and iodine.

Various temperatures of treatment may be employed, for example, from 300–600° F., more or less, and the pressures may be subatmospheric, atmospheric or superatmospheric. While the results may vary with the conditions employed, the pressures and temperatures are chosen so that the hydrocarbons are treated substantially in the vapor phase.

As a specific example of a method of treatment comprised within the scope of the invention and the results obtainable therefrom, the case of a treatment conducted upon vapors of approximate gasoline boiling point range produced in the cracking of a California residuum may be mentioned. Such vapors may be passed upwardly through a mass of moderately fine fuller's earth countercurrent to a descending solution containing approximately 3 to 5% free hypochlorous acid. The vapors may be mixed with a small amount of air to assist in oxidizing reactions and steam to the extent of approximately four pounds per barrel of condensed gasoline. The gasoline produced from the vapors without chemical treatment of any kind may have the following properties:

| | |
|---|---|
| Gravity °A. P. I | 53 |
| Color | Lemon yellow |
| Gums by copper dish method | 500 mgs. |
| Sulphur | 0.45% |

After treatment with reagents in the amounts and the manner described the condensed gasoline may be found to have the following properties:

| | |
|---|---|
| Gravity °A. P. I | 53.3 |
| Color | +30 |
| Color after four hours exposure to sunlight | 26 |
| Gums | 35 mgs. |
| Sulphur | 0.15% |

In another instance a mixture of pressure distillates produced from mid-continent and West Texas cracking stocks may be revaporized and treated with substantially the same amounts of reagents that were used in the preceding example. By simple fractionation without chemical treatment such a mixture of distillate may yield a raw gasoline of the following properties:

| | |
|---|---|
| Gravity °A. P. I | 54 |
| Color | Straw yellow |
| Gums by copper dish method | 425 mgs. |
| Sulphur | 0.4% |

When the vapors are subjected to treatment as described prior to their final fractionation, a finished gasoline of the following properties may be produced:

| | |
|---|---|
| Gravity | 54.3 |
| Color | +30 |
| Color after four hours exposure to sunlight | 27 |
| Gums | 20 mgs. |
| Sulphur | 0.08% |

The foregoing specification containing descriptive material and examples of the results obtainable by the use of the process of the invention have been given for illustrative purposes and while they clearly define the invention and indicate its commercial value, it is to be understood that the invention is not limited thereto as a considerable number of other operations are possible without departing from its scope.

We claim as our invention:

1. In the vapor phase refining of hydrocarbon distillates, the step which comprises contacting the hydrocarbon vapors with an aqueous solution containing free oxygenated halogen acid as the principal refining agent and in sufficient amount to effect substantial desulphurization of the vapors, said acid being selected from the group consisting of hypochlorous acid, chloric acid, bromic acid and iodic acid.

2. In the vapor phase refining of hydrocarbon distillates, the step which comprises treating the vapors with an aqueous solution containing free hypochlorous acid as the principal refining agent and in sufficient amount to effect substantial desulphurization of the vapors.

3. In the vapor phase refining of hydrocarbon distillates, the step which comprises treating the vapors in the presence of steam with an aqueous solution containing free hypochlorous acid as the principal refining agent and in sufficient amount to effect substantial desulphurization of the vapors.

4. In the vapor phase refining of hydrocarbon distillates, the step which comprises treating the vapors in the presence of air with an aqueous solution containing free hypochlorous acid as the principal refining agent and in sufficient amount to effect substantial desulphurization of the vapors.

5. In the vapor phase refining of hydrocarbon distillates, the step which comprises treating the vapors in the presence of steam and air with an aqueous solution containing free hypochlorous acid as the principal refining agent and in sufficient amount to effect substantial desulphurization of the vapors.

GUSTAV EGLOFF.
JACQUE C. MORRELL.